Sept. 26, 1933.                H. F. KOCH ET AL                   1,928,106
                               SPRING TENSION DEVICE
                               Filed May 10, 1933

INVENTORS
Harlowe F. Koch and
Lawrence Wehner
BY Harold E. Stonebraker
ATTORNEY

Patented Sept. 26, 1933

1,928,106

UNITED STATES PATENT OFFICE 1,928,106

SPRING TENSION DEVICE

Harlowe F. Koch, Rochester, and Lawrence Wehner, Greece, N. Y., assignors to The Haloid Company, Rochester, N. Y., a corporation of New York Application May 10, 1933. Serial No. 670,312

8 Claims. (Cl. 242—71)

This invention relates to a spring tension device, and is intended more particularly for imposing a drag on and centering the spool which supports a sensitized roll in a photo-copy machine.

Heretofore, in machines of this character, the roll carrying spool has been controlled by springs permanently attached to the walls of the box or container, and such devices have been objectionable due to the breakage of the springs and the need for changing the tension exerted on the spool, and it is one of the purposes of this invention to provide a spring tension device that can be detachably positioned on a wall of the sensitized roll box without requiring any permanent connection thereto.

Another object of the invention is to afford a spring tension device, which while detachably held in operative position, cooperates with the spool supports in such a way that it is held against turning movement with relation to the container and functions properly in its relation to the spool while so mounted.

A further purpose of the improvement is to provide a device of simple construction which can be manufactured at a low cost, preferably in one piece, and can be adjusted so as to vary the tension on the spool and to properly center the spool in the container.

To these and other ends, the invention consists in the construction and arrangement of parts that will appear clearly from the following description when read in conjunction with the accompanying drawing, the novel features being pointed out in the claims following the specification.

Figure 1:
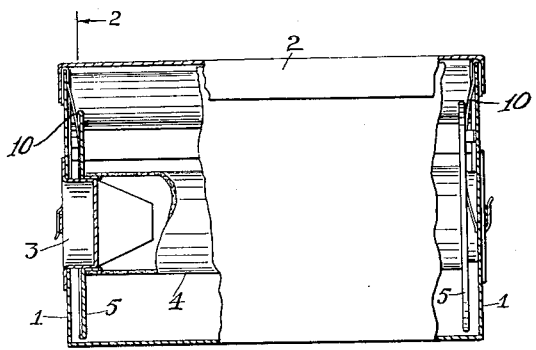
Fig. 1 is a vertical sectional view, partially in side elevation, of a conventional type of sensitized roll box such as used in some photo-copy machines, and showing the application of the invention in its preferred embodiment.
Figure 2:
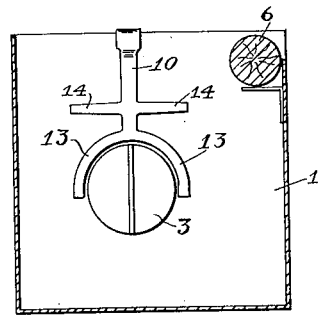
Fig. 2 is a transverse sectional view on line 2—2 of Fig. 1.
Figure 3:
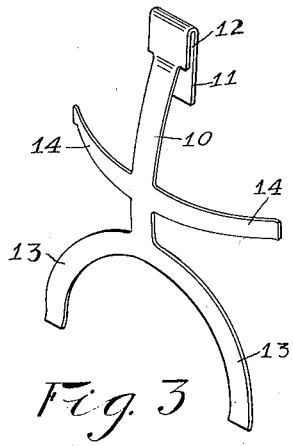
Fig. 3 is a detail perspective view of the spring tension device removed from the container.

In the construction illustrated in Figs. 1 to 3, 1 designates the end walls of the box or container having a removable cover 2. The end walls 1 are provided with openings to receive removable spool supports or trunnions 3 which project inwardly into the box, and rotatably mounted on these supports 3 is a spool 4 having ends 5 that are spaced from the end walls 1 of the box.

The spool 4 carries a roll of sensitized paper that is drawn out of the box over the roll 6 to the other parts of the photo-copy machine, as well known in the art, and the device forming the subject of this invention is removably located on the end walls 1 between the same and the ends 5 of the spool and serve to impose the proper drag or tension on the spool so that the paper will not overrun as it is drawn from the box and also to center the spool and likewise the roll of sensitized paper thereon with reference to the box.

The device, which is preferably formed of an integral piece of spring steel, comprises a body or vertical portion 10 having means at its upper end for detachably engaging a wall of the container. To accomplish this, the upper end is preferably bent upon itself as at 11, affording a slot 12 into which the wall 1 of the container engages when the tension device is forced downwardly thereon. The slot 12 is of such width that the device will engage the wall with sufficient friction to prevent accidental removal.

The body portion 10 is bowed outwardly, as shown in Fig. 3, and at its lower end terminates in the inwardly bowed arcuate arms 13 affording a semi-circular portion that embraces the circular trunnion or spool support 3, as shown in Fig. 2, thus preventing turning or other movement of the tension device in any direction except toward or from the wall 1.

Intermediate the upper and lower ends of the body 10 are the arms 14 extending in opposite directions and curving inwardly, affording a convex yieldable portion, the ends of which engage the wall 1 on which the device is mounted while the outwardly curved central portion engages the spool end 5 with sufficient tension to hold the latter against turning at excessive speed as the paper is drawn therefrom. The arms 14, and likewise the arms 13, can be flexed to a greater or less degree toward the wall 1 by slightly bending them before positioning the device, so as to vary the amount of drag or tension and also to vary the relative endwise relation of the spool in order to center the latter correctly in the box.

Figure 4:
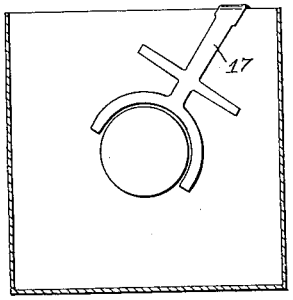
Fig. 4 is a transverse sectional view showing the application of a modified form of the device.
Figure 5:
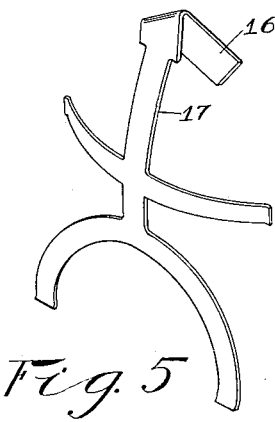
Fig. 5 is a perspective view of the modified form illustrated in Fig. 4.

The structure shown in Figs. 1 to 3 is adapted to one known style of photo-copy machine, and in Figs. 4 and 5 there is illustrated a slightly modified form that can be used with another type of photo-copy machine in which the roll of sensitized paper and its supporting spool are closer to the top or cover of the container. In this arrangement, instead of having the reversely turned portion 11 in alinement with the body portion 10, these parts are arranged in an angular relation to each other, the portion 16 being bent backwardly upon the body 17 at the angle shown in Fig. 5, so that when the device is positioned in the box, the body portion 17 extends upwardly from the spool at an angle to the vertical, as shown in Fig. 4. In other respects, the structure and function of the parts is the same as with the form disclosed in Figs. 1 to 3.

A device of this kind can be quickly positioned, or removed from the wall of a sensitized roll box, and can be easily adjusted to vary the tension. If broken, it can be readily replaced so that the operation of the machine is not interrupted, and it can be manufactured and supplied at a low cost for use on any standard types of machines.

While the structure has been described with reference to a particular embodiment, it is not confined to the details disclosed, and this application is intended to cover any changes or departures coming within the contemplated purposes of the invention or the scope of the following claims.

We claim:

1. The combination with a box including oppositely disposed walls having inwardly projecting spool supports, of a roll carrying spool rotatably mounted on said supports and having ends spaced from said walls, of a spool tensioning device detachably mounted on each of said walls and comprising a convex spring portion, the ends of which engage the adjacent wall and the center of which engages the adjacent end of the spool, and locking means engageable with the spool support for preventing turning of the tension device.

2. The combination with a box including oppositely disposed walls having inwardly projecting spool supports, of a roll carrying spool rotatably mounted on said supports and having ends spaced from said walls, of a spool tensioning device detachably mounted on each of said walls and comprising a convex spring portion, the ends of which engage the adjacent wall and the center of which engages the adjacent end of the spool, and an arc-shaped locking member engageable with said spool support and acting to prevent turning of the tension device.

3. The combination with a box including oppositely disposed walls having inwardly projecting spool supports, of a roll carrying spool rotatably mounted on said supports and having ends spaced from said walls, of spool tensioning devices each comprising means at its upper end for detachably engaging the wall, means at its lower end having locking engagement with said spool support to prevent turning of the spool tensioning device, and means intermediate its ends having yieldable engagement with the adjacent spool end and the adjacent wall.

4. The combination with a box including oppositely disposed walls having inwardly projecting spool supports, of a roll carrying spool rotatably mounted on said supports and having ends spaced from said walls, of spool tensioning devices each comprising a yieldable spring body having a portion bent upon itself at its upper end for engagement with the wall, arc-shaped arms at its lower end for engagement with the spool support, and oppositely extending convex arms intermediate the ends for engagement with opposed surfaces of the wall and spool end respectively.

5. A spring tension device comprising a central body portion having one end bent upon itself affording means for detachably engaging a wall, the opposite end terminating in arcuate arms affording means for engagement with a spool support, and oppositely projecting arms intermediate the ends affording a convex spring portion, the ends of which are engageable with an adjacent wall and the convex central portion of which is engageable with a rotatable spool.

6. A spring tension device comprising a central body portion having one end bent upon itself affording means for detachably engaging a wall, the opposite end terminating in a locking portion engageable with a spool support to prevent turning of the device, and oppositely projecting arms intermediate the ends affording a convex spring portion, the ends of which are engageable with an adjacent wall and the convex central portion of which is engageable with a rotatable spool.

7. A spring tension device comprising a central body portion having means at its upper end for detachably engaging a support, and oppositely projecting arms affording a convex spring portion, the ends of which are engageable with an adjacent wall and the central portion of which is engageable with a rotatable spool.

8. A spring tension device comprising a central body portion having means at its upper end for detachably engaging a support, a locking portion engageable with a spool support to prevent turning of the device, and oppositely projecting arms affording a convex spring portion, the ends of which are engageable with an adjacent wall and the central portion of which is engageable with a rotatable spool.

HARLOWE F. KOCH.
LAWRENCE WEHNER.